United States Patent Office 3,213,418
Patented Oct. 19, 1965

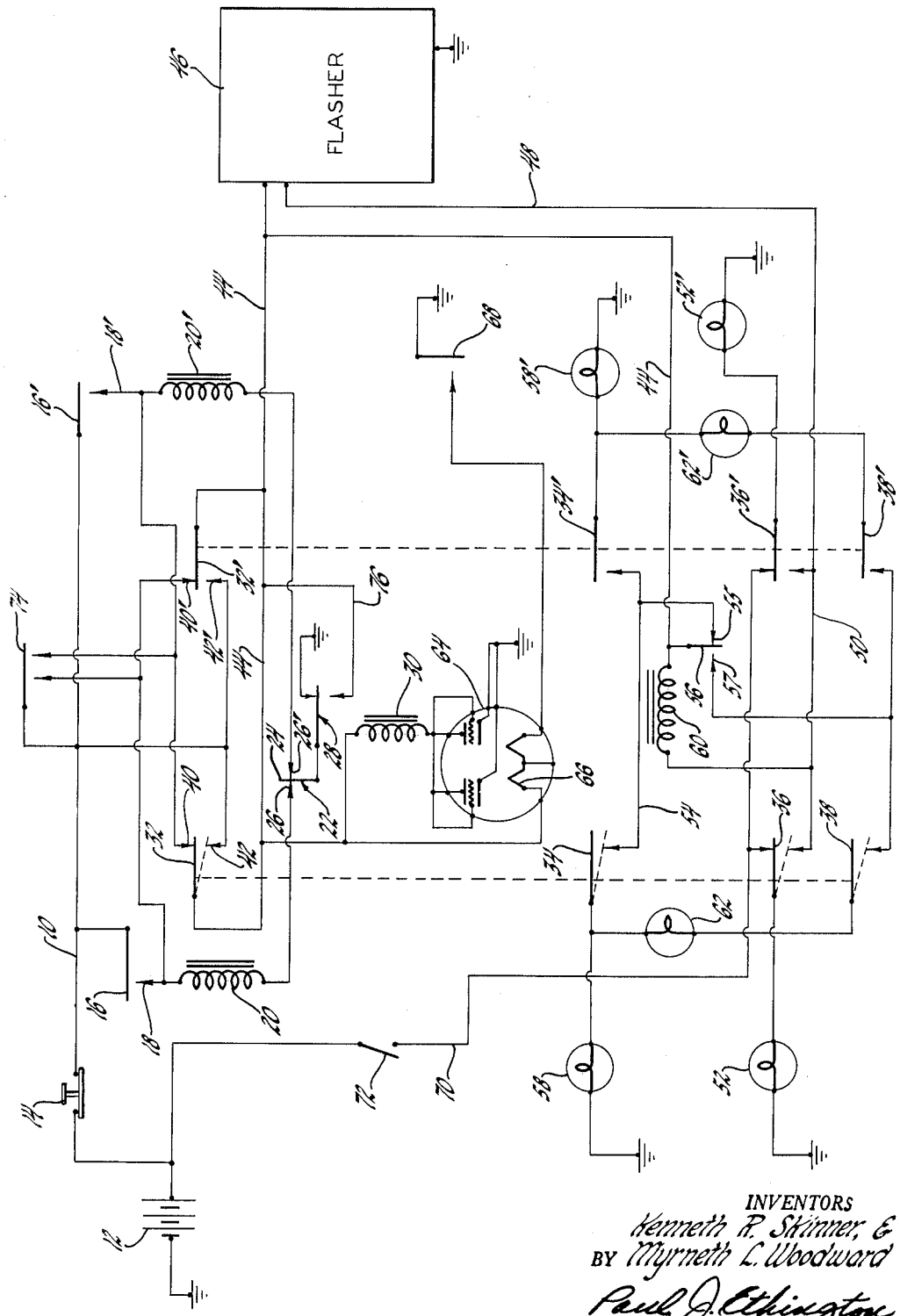

3,213,418
TURN SIGNAL AND WARNING SYSTEM
Kenneth R. Skinner, Anderson, and Myrneth L. Woodward, Lapel, Ind., assignors to General Motors Corporation, Detroit, Mich., a corporation of Delaware
Filed Aug. 8, 1961, Ser. No. 130,158
9 Claims. (Cl. 340—83)

This invention relates to a warning system and more particularly to an electronic turn signal system combined with an emergency signal system.

Heretofore, turn signal systems as conventionally used on motor vehicles have utilized two position switches for connecting either a left or right signal light circuit to a flasher and have required a complex mechanical canceling system mounted within the steering column to automatically return the switch to neutral position. Upon signalling a turn, if the operator for some reason does not make a turn as indicated or if he makes only a slight turn, the signals will not be canceled and will continue flashing until the operator remembers to cancel the signal by manual actuation of the turn signal lever. Further, it is frequently desirable, particularly on trucks, to provide a warning system which will indicate an emergency condition by flashing lights simultaneously on both the right and left sides of the vehicle. Usually a separate circuit is provided for this purpose.

The objects of this invention are to provide an electrical turn signal system having means to cancel an indicated signal after a predetermined combination of time delay and vehicle speed has occurred and to eliminate complex mechanical canceling devices. A further object is to provide a turn signal system which may be utilized as an emergency warning system. Another object is to provide a turn signal having a lamp burnout indicator which is independent of the type of flasher mechanism used.

The invention is carried out by an electrical system having a pair of relay operated switches for either right or left turn indication. Either relay is maintained in operative condition by a holding circuit. The relays are connected in series with a pair of switches, one of the switches being related to a vehicle speed condition and the other switch being a time delay switch. An emergency switch associated with the holding circuit is adapted to energize both relays simultaneously in order to cause flashing of all the turn signal lamps. The condition of the turn signal lights is indicated by an indicator lamp in series with one signal lamp and being actuated by a relay armature whose coil is in series with another signal lamp.

The above and other advantages of the invention will be made more clear from the accompanying drawing which is a schematic electrical diagram of a turn signal system according to the subject invention.

Referring to the drawing, a turn signal system is schematically illustrated which comprises a power supply line 10 from the vehicle battery 12 containing a normally closed push button switch 14 and which leads to a pair of normally open push button switches 16, 16', which are adapted to actuate the left and right "turn" signal circuits, respectively. Each of the push button switches 16, 16' has an associated contact 18, 18' which is connected to the coil 20, 20' of a relay.

Both of the relay coils 20, 20' are connected to ground through a normally closed canceling switch 22 comprising an armature 24 and two contacts 26, 26' and through a double throw single pole switch 28 having an armature actuated by a relay coil 30. The switch 28 is normally closed to ground. Each of the relays 20, 20' serves to actuate four switches 32, 34, 36, 38 and 32', 34', 36', 38', two of which 32, 32' are holding switches for their corresponding coils 20 and 20', respectively, and the others of which select either a right or left turn. The holding switch 32 operates between a pair of contacts 40 and 42, one of which 42 is connected to the power supply line 10 and the other of which 40 is connected to the opposite relay coil 20'. The armatures of the two switches 32, 32' are electrically interconnected by an intermediate power line 44 so that when either 32 or 32' is pulled down to make contact with contact 42 or 42' which are in contact with the power supply line 10, the intermediate line 44 is energized. The contact 40' is connected with the relay coil 20.

A flasher 46 of any desired type is connected to the intermediate supply line 44 and furnishes an output voltage which is periodic and is suitable for flashing a signal lamp. Preferably, however, the flasher is of the type having a flashing rate which is independent of the load thereon, such as disclosed in our now abandoned application Serial No. 130,157, also filed August 8, 1961. The flasher output line 48 leads to a rear turn signal circuit 50 and will energize the left or right or both of the rear turn signal lamps 52, 52' if their respective switches 36, 36' are closed. The intermediate supply line 44 is similarly connected to the front turn signal circuit 54 through a stationary contact 55, a relay armature 56, and will energize one or both of the front signal lamps 58, 58' if the respective switches 34, 34' are closed. The relay coil 60 which actuates the armature 56 is connected between the constant voltage of the intermediate supply line 44 and the periodic voltage of the rear turn signal circuit 50 so when circuit 50 is energized, there will be no voltage across the coil. However, when circuit 50 is not energized, there will be sufficient voltage applied across the coil to energize it, thereby causing the relay armature 56 to oscillate between its contacts 55 and 57. The circuit 44 is connected through the relay armature 56 and the contact 57 and a switch 38 or 38' to an indicator lamp 62 or 62' which in turn is grounded through a front turn signal 58 or 58', respectively.

The intermediate supply line 44 also furnishes power to the relay coil 30 which is connected to the plate of a vacuum tube 64, the corresponding cathodes of which are connected to ground. The same supply voltage is fed to the vacuum tube filaments 66 which are in series with a normally open switch 68 which is controlled by the position of the accelerator pedal or to the speed of the vehicle.

The operation of the turn signal system will now be described. To actuate the left turn signal, for example, the push button switch 16 is manually closed to energize the relay 20 which is grounded through the mechanical canceling switch 22 and the relay switch 28. The switches 32 through 38 associated with the relay coil 20 will be pulled to their downward position as indicated by dotted lines so that the holding armature 32 will engage the holding contact 42. Current will flow from the power line 10 through the holding contact 42, the holding armature 32, and through the intermediate power line 44 to the right relay armature 32' and thence through the upper contact 40' of that armature and to the energized relay 20. The manually operated push button 16 may then be released and the relay 20 will be maintained in an energized condition. The current from the intermediate supply line 44 will operate the flasher 46 and in addition will flow through the armature 56 and the left front switch 34 to light the left front signal lamp 58. Assuming that current is simultaneously flowing in the flasher output line 48, this latter current will light the left turn signal lamp 52 which is connected thereto by the closed switch 36. When the flasher current is interrupted the constant current from the intermediate supply line 44 will flow through the relay coil 60 and through the left rear lamp 52 in order to energize the relay 60 and move the armature 56 into engagement with the contact 57, thereby interrupting the current flow to the front signal circuit 54. Although the current flowing through the relay coil 60 also flows through the rear signal lamp 52, the current due to the resistance of the coil 60 will be insufficient to light the lamp. Simultaneously, current will flow through the armature 56, contact 57, and switch 38 to the left indicator lamp 62 and through the front signal lamp 58, but the resistance values of these two lamps are so chosen that the current flowing therethrough will be sufficient to light the indicator lamp 62 but not the signal lamp 58. It will readily be seen, however, that the indicator lamp 62 will not light if the filament in the left front signal lamp 58 is open, and additionally, current will not flow through the relay if the filament of the rear signal lamp 52 is open, thereby preventing the closing of the armature 56 with the contact 57. Hence the lighting of the indicator lamp will be a positive indication that both left signal lamps are operative, whereas an open filament in either signal lamp will cause the indicator lamp to remain unlit.

The switches 36, 36' associated with the rear signal lamps are normally in contact with the line 70 energized by the brake switch 72 so that application of the vehicle brake will cause both rear signal lamps to light. However, if one of the switches is depressed by operation of one of the relay coils 20, 20', then the corresponding rear lamp will flash while the other rear lamp remains connected to the brake switch 72.

Since the circuit is symmetrical, the operation of the right turn signal switches and lamps is identical to that described above for the left turn signal circuit. In the event of an emergency, when it is desired to flash all signals of the vehicle simultaneously, both relays 20 and 20' may be energized in order to simultaneously operate both sets of turn signals. This is accomplished by closing the emergency switch 74 which connects the power supply line 10 to the relays 20 and 20'. Since in this condition both holding armatures would be in a downward position, the holding circuit is inoperative. Accordingly, a separate means (not shown) should be provided to hold the emergency switch in closed position in order to maintain all the signal lamps in operation.

Three canceling devices are provided to deenergize the relay coils 20 and hence the signals. First is a manual canceling device which is a push button switch 14 which interrupts the power supply circuit. Opening of the switch 14 will deenergize the entire signal circuit so that any energized relay will drop out, thereby returning the system to neutral position. The mechanical canceling switch 22 is analogous to that conventionally used in automobiles and comprises a switch armature 24 which is contacted by a cam (not shown) mounted on the steering wheel. The armature 24 is so arranged that when deflected by the cam upon one direction of steering wheel rotation, it will open the circuit of only one of the relay coils 20 or 20' while, if deflected by the cam from the other direction, it will open only the other circuit. Hence when the left relay coil 20 is energized to signal a left turn and the steering wheel is turned to the left, only the circuit of coil 20' will be interrupted and the coil 20 will be unaffected. Upon completion of the turn, the steering wheel will be turned to the right thereby opening the circuit of coil 20. The third canceling device includes the relay coil 30 and armature 28, the associated vacuum tube 64, and the accelerator switch 68. The accelerator switch 68 is adjusted to close when the accelerator pedal reaches a position corresponding to, say, 20 miles per hour. When the accelerator switch 68 is closed, current will flow from the intermediate supply circuit 44 through the vacuum tube filaments to ground. After a predetermined time, the filaments will heat the cathodes sufficiently well to cause emission of the cathodes thereby causing current flow through the relay coil. This energization of the relay coil will pull down the armature 28 to break the circuit of relay 20 and will connect the armature 28 with a line 76 associated with the intermediate supply circuit 44 to short out the relay coil 20 in order to assure deenergization. This combined speed and time delay canceling device is advantageous in that it will cause the turn signal to be automatically canceled if a turn has not been made or if the turn were too slight to effect operation of the canceling switch 22 provided the vehicle has maintained the predetermined speed for a given length of time.

It will thus be readily seen that this invention provides a unique turn signal and warning flasher system in which an emergency warning signal can be given by flashing all of the turn signal lamps simultaneously. This may be carried out by the simple expediency of actuating both sets of turn signals at the same time. Further advantages of the invention include the specific means whereby positive indication of signal lamp burnout is obtained as well as the vacuum tube canceling circuit which serves to cancel the turn signals upon the basis of time and vehicle speed. It is further apparent that the mechanical canceling switch 22 in combination with the electromechanical switch actuating means renders unnecessary the complex and expensive mechanical actuating and canceling arrangements conventionally used in present day vehicles.

While a specific embodiment of the invention has been described for illustrative purposes, the scope of the invention is intended to be limited only by the following claims.

We claim:

1. In a turn signal circuit having a pair of signal lamps for indicating a turn and means for detecting failure of said lamps, a source of constant voltage, means for connecting one of said signal lamps directly to said source, means connected with said source for providing an intermittent voltage for energizing the other of said signal lamps and means responsive to both of said voltages for periodically connecting said detecting means in series with one of said lamps.

2. A turn signal system comprising a source of voltage, a flasher connected to said source having an intermittent voltage output, a first lamp energized by voltage from said flasher, a second lamp energized by voltage directly from said source, an indicator lamp, means responsive to the interruption of said flasher voltage for connecting said indicator lamp in series with said second lamp.

3. A turn signal system comprising a source of voltage, a flasher connected to said source having an intermittent voltage output, a first circuit energized by voltage directly from said source, a second circuit energized by voltage from said flasher, an indicator circuit, means responsive to the interruption of said flasher voltage for interrupting the voltage to said first circuit and simultaneously applying said voltage to said indicator circuit, said indicator circuit being serially connected with said first circuit, each of said circuits having a pair of lamps for connection therewith, and switch means for connecting said lamps to said circuits.

4. A signal lamp burnout indicating circuit comprising a source of voltage, first and second signal lamps, burnout indicating means, relay means connecting said first signal lamp in series with said source, a flasher connected in parallel with said relay means, said relay means including contact means normally connecting said second signal lamp to said source, said relay means being periodically energized in response to operation of said flasher to cause said contact means to connect said indicator means in series with said second signal lamp whereby said indicator means will be energized only when both of said signal lamps are operative.

5. A signal lamp burnout indicating circuit comprising a source of voltage, first and second signal lamps, an indicator lamp, a flasher connecting said first signal lamp in series with said source, a relay connected in parallel with said flasher and periodically energized in response to operation of said flasher, said relay including contact means connecting said second signal lamp in parallel with said flasher and said first signal lamp in response to deenergization of said relay, energization of said relay causing said contact means to connect said indicator lamp in series with said second signal lamp whereby said indicator lamp will only be energized when both of said signal lamps are operative.

6. A turn signal circuit comprising a voltage source, first and second signal lamps, a relay connected between said source and said first signal lamp, switching means connected in parallel with said relay for periodically short-circuiting said relay, an indicator lamp, said relay including an armature normally connecting said second signal lamp to said source but adapted to connect said indicator lamp between said second signal lamp and said source when said relay is energized.

7. A turn signal circuit comprising a voltage source, first and second signal lamps and an indicator lamp, periodic circuit interrupting means connected between said source and said first signal lamp, relay means connected in parallel with said circuit interrupting means and including contact means normally connecting said second signal lamp with said source, said relay means responsive to the operation of said circuit interrupting means for disconnecting said second signal lamp from said source and connecting said indicator lamp to said source.

8. A turn signal circuit comprising a voltage source, a first signal lamp, a flasher connecting said source to said first signal lamp, relay means including a relay coil, an armature and a first and second stationary contact, said coil being connected in parallel with said flasher, said armature connected between said source and said flasher and normally in engagement with said first stationary contact but adapted to engage said second stationary contact upon energization of said coil, a second signal lamp, said first stationary contact being connected to said second signal lamp, an indicator lamp connected between said second stationary contact and said second signal lamp.

9. A turn signal circuit comprising a source of voltage, first and second signal lamps, an indicator lamp, a flasher connecting said first signal lamp in series with said source, a relay connected in parallel with said flasher and periodically energized in response to operation of said flasher, said relay including contact means connecting said second signal lamp in parallel with said flasher and said first signal lamp in response to the energization of said relay, energization of said relay causing said contact means to connect said indicator lamp in series with said second signal lamp, the respective impedances of said indicator lamp and said relay being such that said signal lamps are deenergized when said relay is energized.

References Cited by the Examiner

UNITED STATES PATENTS

| | | |
|---|---|---|
| 1,808,683 | 6/31 | Rooney. |
| 1,826,477 | 10/31 | Olpp. |
| 2,082,789 | 6/37 | Chase _____ 340—83 |
| 2,090,332 | 8/37 | O'Neill. |
| 2,300,896 | 11/42 | Hosmer _____ 340—83 |
| 2,706,808 | 4/55 | Hollins _____ 340—83 X |
| 2,799,786 | 7/57 | Ellenberger _____ 340—80 XR |
| 2,835,880 | 5/58 | Daws _____ 340—81 |
| 3,002,127 | 9/61 | Grontskowsky _____ 340—81 X |

NEIL C. READ, *Primary Examiner.*

BENNETT G. MILLER, *Examiner.*